(12) United States Patent
Dropps (10) Patent No.: US 10,997,074 B2
(45) Date of Patent: May 4, 2021

(54) MANAGEMENT OF COHERENCY DIRECTORY CACHE ENTRY EJECTION

(71) Applicant: HEWLETT PACKARD ENTERPRISE DEVELOPMENT LP, Houston, TX (US)

(72) Inventor: Frank R. Dropps, Annandale, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/399,378

(22) Filed: Apr. 30, 2019

(65) Prior Publication Data

US 2020/0349077 A1   Nov. 5, 2020

(51) Int. Cl.
G06F 12/08 (2016.01)
G06F 12/0817 (2016.01)
G06F 12/123 (2016.01)

(52) U.S. Cl.
CPC ........ G06F 12/0817 (2013.01); G06F 12/124 (2013.01); *G06F 2212/608* (2013.01)

(58) Field of Classification Search
CPC ............... G06F 12/0817; G06F 12/124; G06F 2212/608
USPC ........................................................ 711/136
See application file for complete search history.

(56) References Cited

U.S. PATENT DOCUMENTS

| 6,154,811 | A | 11/2000 | Srbljic et al. |
| 7,577,793 | B2 | 8/2009 | Borkenhagen et al. |
| 8,195,892 | B2 | 6/2012 | Kornegay et al. |
| 2004/0088496 | A1 | 5/2004 | Glasco et al. |
| 2007/0079072 | A1 | 4/2007 | Collier et al. |
| 2011/0161589 | A1* | 6/2011 | Guthrie .............. G06F 12/0811 711/122 |
| 2014/0040561 | A1 | 2/2014 | Lih et al. |

OTHER PUBLICATIONS

Dimitris Tsaliagos, "Design and Implementation of a Directory based Cache Coherence Protocol," May 2011, pp. 1-71, Institute of Computer Science, Heraklion, Greece.
Wikipedia, "Cache Invalidation," retrieved online Jan. 8, 2019, https://en.wikipedia.org/wiki/Cache_invalidation.

* cited by examiner

*Primary Examiner* — Hua J Song
(74) *Attorney, Agent, or Firm* — Hewlett Packard Enterprise Patent Department (57) ABSTRACT

In exemplary aspects of managing the ejection of entries of a coherence directory cache, the directory cache includes directory cache entries that can store copies of respective directory entries from a coherency directory. Each of the directory cache entries is configured to include state and ownership information of respective memory blocks. Information is stored, which indicates if memory blocks are in an active state within a memory region of a memory. A request is received and includes a memory address of a first memory block. Based on the memory address in the request, a cache hit in the directory cache is detected. The request is determined to be a request to change the state of the first memory block to an invalid state. The ejection of a directory cache entry corresponding to the first memory block is managed based on ejection policy rules.

17 Claims, 5 Drawing Sheets

Coherency Directory — 109-1

|    | Tag | State | Ownership |
|----|-----|-------|-----------|
| d1 | m01 | 01 | [105-2, 105-4] |
| d2 | m02 | 00 | [null] |
| d3 | m03 | 11 | [105-1] |
| d4 | m05 | 10 | [105-2] |
|    | ... | ... | ... |
| d20 | m25 | 01 | [105-3, 105-2] |

Active / Invalid Counter Directory — 103-1d

| Address Range | Active Counter |
|---------------|----------------|
| m01 - m10 | 3 |
| m11 - m20 | 0 |
| m21 - m30 | 1 |
| ... | ... |

Coherency Directory — 103-1dc

|      | Tag | State | Ownership |
|------|-----|-------|-----------|
| dc1  | m01 | 01 | [105-2, 105-4] |
| dc2  | m02 | 00 | [null] |
| dc3  | m03 | 11 | [105-1] |
| dc4  | m05 | 10 | [105-2] |
| dc5  |     |    |    |
|      | ... | ... | ... |
| dc20 | m25 | 01 | [105-3, 105-2] |

MANAGEMENT OF COHERENCY DIRECTORY CACHE ENTRY EJECTION

BACKGROUND

In a multiprocessor shared memory system, data can be shared with processors, resulting in copies of that data being stored in processor caches. Cache coherency is employed to ensure that changes to the shared data or to copies of that data are propagated throughout the system, such that all copies reflect the same value and the processors can have access to uniform data. Some cache coherency protocols employ coherency directories to track and store the state and ownership information of memory blocks of a shared memory. Coherency directory caches can be employed to provide faster access to a selected subset of the coherency directory entries tracked by coherency directories, including the state and ownership information stored therein.

BRIEF DESCRIPTION OF THE DRAWINGS

Certain examples are described in the following detailed description and in reference to the drawings, in which.

DETAILED DESCRIPTION

In the foregoing description, numerous details are set forth to provide an understanding of the subject disclosed herein. However, implementations may be practiced without some or all of these details. Other implementations may include modifications and variations from the details discussed below. It is intended that the appended claims cover such modifications and variations.

The present disclosure provides for the management of aspects of cache coherency, including the ejection of directory cache entries from coherency cache directory caches. Cache coherency can be provided by employing coherency directories, which are stored in respective memories. Coherency directories store and/or track the state and ownership of memory blocks of associated memories. The state and ownership information indicates whether memory blocks are being shared with other processors in a multiprocessor, shared memory system, and, if so, which processors. This information can be used to ensure that coherency across the multiprocessor shared memory system is achieved—e.g., that changes to shared data are propagated throughout the system.

Moreover, in multiprocessor shared memory systems, node controllers can be deployed to manage a respective subset of the processors and memories of the system. Among other things, each of the node controllers can manage messages or requests relating to its respective memories and provide cache coherency for and/or on behalf of its memories. To process and/or respond to messages and requests, the node controllers at times need to obtain state and/or ownership information of memory blocks, and do so by fetching the information from coherency directories stored in the respective memories. To reduce the resource burden (e.g., time, bandwidth, processing, power) caused by fetching state and ownership information from associated memories, the node controllers can utilize relatively minimal resources to maintain coherency directory caches that store subsets of the information in the coherency directories. Using coherency directory caches, node controllers can quickly respond or process certain requests or messages without necessarily needing to fetch or retrieve data from associated memories. Due to the limited capacity of the coherency directory caches relative to their corresponding coherency directories, among other things, it is desirable for coherency directory caches to maintain copies of directory entries of higher value (e.g., more likely to be used or accessed), such that higher cache hit rates can be achieved; and/or have empty or used directory cache entries such that other directory entries can be added to or cached in the directory caches without first needing to identify cache entries for ejection and eject or remove existing directory cache entries. It should be understood that ejecting or removing directory cache entries refers to the deletion of the directory entry data copied therein, such that it is in an unused state for an uncached directory entry to subsequently be copied into that directory cache entry.

Figure 1:
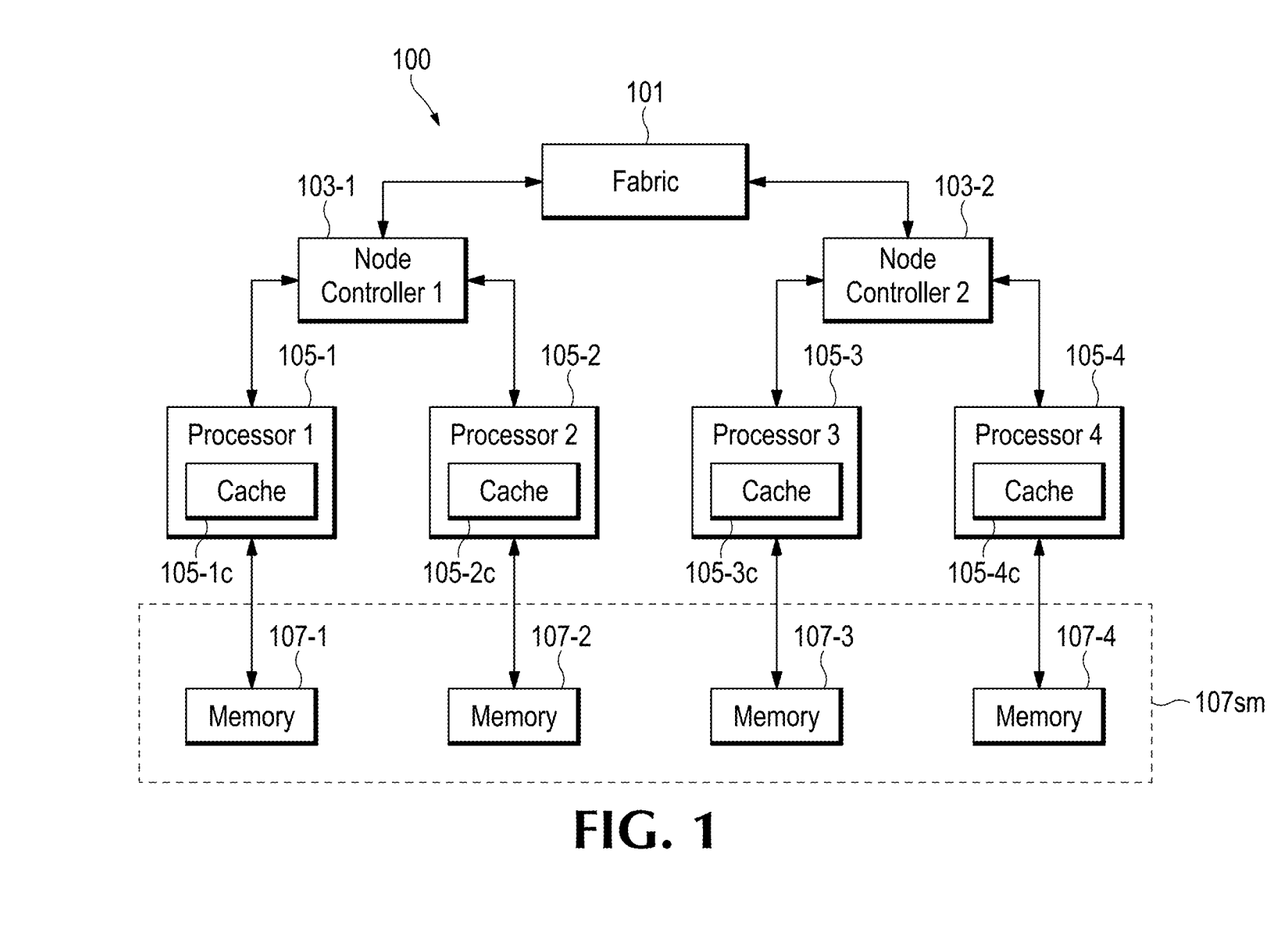
FIG. 1 is a diagram illustrating an exemplary embodiment of a cache coherent, shared memory system.

FIG. 1 illustrates an exemplary embodiment of a cache coherent computing system 100 (or "system") formed of various interconnected computing components. In some embodiments, the system 100 is a multiprocessor system and that includes a shared memory accessible by some or all of the processors. More specifically, as shown in FIG. 1, the system 100 includes processors 105-1 (processor 1), 105-2 (processor 2), 105-3 (processor 3) and 105-4 (processor 5) (collectively referred to herein as "105" or "processors 105"). As described in further detail below, the processors 105 are communicatively coupled to respective node controllers 103-1 (node controller 1) and 103-2 (node controller 2) (collectively referred to herein as "103" or "node controllers 103"), through which they can communicate with one another.

Each of the processors 105 can be or refer to one or more processing resources, nodes or units configured to execute instructions. For example, each of the processors 105 can be or refer to one or more central processing units (CPUs), a dual-core or a multi-core processor made up of two or more CPUs, a computing cluster, a cloud server, or the like. In some embodiments, two or more of the processors 105 (e.g., processor 105-1 and processor 105-3) can be communicatively coupled using point-to-point interconnects or busses. For example, two or more of the processors 105 can be connected using Intel's Ultra Path Interconnect (UPI) or Intel's QuickPath Interconnect (QPI).

Moreover, each of the processors 105 can include or be associated with one or more processor caches for storing copies of data stored in system memory, and thereby making that data more quickly accessible by the processors. Specifically, caches 105-1c, 105-2c, 105-3c, and 105-4c (collectively referred to herein as "105c" or "caches 105c") are included and/or associated with the processors 105-1, 105-2, 105-3 and 105-4, respectively. It should be understood that, in some embodiments, multiple processors can share a single cache. It should also be understood that each cache can be physically disposed on the same or a separate chip or component as its corresponding processor. Because data can be accessed more quickly by a processor from its cache than from system memory, the caches 105c can be used to store copies of data originally stored in system memory that, for example, are accessed more frequently and/or may need to be accessed with more efficiency by a processor.

As shown in FIG. 1, the processors 105-1, 105-2, 105-3 and 105-4 are communicatively coupled to memories 107-1, 107-2, 107-3 and 107-4 (collectively referred to herein as "107" or "memories 107"). In some embodiments, the memories 107 form a shared system memory that can be accessed by all or some of the processors 105, as described in further detail below. It should be understood that, while each of the processors 105 can, in some embodiments, be communicatively coupled to and/or access data in one or more of the memories 107, each of the processors 105 can be directly associated with a respective one of the memories 107. Such correspondence or association between each of the processors 105 and one of the memories 107 can be caused by or result from a direct attachment or connection between them. For example, the processor 105-1 can be directly attached to the memory 107-1, as illustrated in FIG. 1. In some embodiments, a memory (e.g., memory 107-1) can be deemed to be local to its corresponding (e.g., directly connected) processor (e.g., processor 105-1), and can be referred to as "local memory" relative to its corresponding processor. On the other hand, a memory (e.g., memory 107-1) can be deemed remote or referred to as "remote memory) relative to other processors (e.g., processor 105-3).

The processors 105 (and/or memory controllers of the processors 105) can be communicatively coupled (e.g., directly connected) to their respective memories 107 via one or more memory channels and/or buses such as a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, Double Data Rate (DDR), SATA, SCSI, or Fibre Channel Bus, and the like.

Each of the memories 107 can include or be made up of any number of memory devices, which can be volatile (e.g., Random Access Memory (RAM), Static RAM (RAM) (SRAM), Dynamic RAM (DRAM)) and/or non-volatile (e.g., Non-Volatile RAM (NVRAM), Double Data Rate 4 Synchronous Dynamic (RAM) DDR4 SDRAM) memory devices. Other types of memory devices that may be used include read-only memory (ROM) (e.g., mask ROM, programmable ROM (PROM), erasable programmable ROM (EPROM), and electrically erasable programmable ROM (EEPROM)), flash memory, memristor devices, and the like.

As mentioned above, the memories 107 (or blocks or regions thereof) can form a shared system memory 107sm. Some or all of the processors 105 can access data stored in the system memory 107sm. For example, data stored in a portion of the memory 107-1 that is shared and thus a part of the system memory 107sm can be accessed by processors other than processor 105-1. It should be understood that permissions can be used to control access to all or portions of the system memory 107sm and/or by all or some of the processors 105. It should be understood that, for purposes of simplicity, unless indicated otherwise, reference herein to the any or all of the memories 107 shall refer to the portions that are shared and that make up the system memory 107sm, although the memories 107 can, in some embodiments, include non-shared regions.

In some embodiments, accesses to or management of the memories 107 can be provided or handled by the corresponding node controllers 103. That is, processors (e.g., processor 105-1 and 105-2) and their corresponding memories (e.g., memories 107-1 and 107-2) are deemed to be local to the node controller (e.g., node controller 103-1) with which they are associated (e.g., directly connected to, or most closely connected to). The node controllers 103 are therefore configured to provide and/or execute various functions on behalf of, for, or associated with their local or respective computing resources (e.g., memories, processors). Such functions can include or relate to cache coherency, routing, load balancing, fault resilience and the like. In some embodiments, some or all of the functionality of each of the node controllers 103 described herein can be implemented in a processor (e.g., one of the processors 105).

The node controllers 103 (also referred to as "hubs") are computing devices or components, which can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. It should be understood that the computing system 100 can include any number of node controllers. As described in further detail below with reference to FIGS. 3 and 4, the node controllers 103 provide cache coherency management and acceleration using hardware (e.g., hardware sequencer, hardware state machine and/or other circuits) or software (e.g., machine readable instructions executed a microprocessor, microcontroller or the like).

Although not illustrated in FIG. 1, each of the node controllers 103 can include one or more memories or memory devices, such as ROM, RAM, EEPROM, flash memory, registers or any other form of storage medium known to those of skill in the art. As described in further detail below, the memory of the node controllers 103 can be used to store information used to provide cache coherency, such as state and ownership information relating to memory blocks in their local memories. As described in further detail below and illustrated in exemplary FIG. 2, the node controllers 103 can employ directories and/or directory caches to track state and ownership information, and thereby provide, among other things, cache coherency and acceleration. In some embodiments, cache coherency and acceleration can include managing coherency directories and directory caches, including what and when directory cache entries can or should be ejected. It should be understood, however, that as described herein, state and ownership information can additionally or alternatively be stored in the memories 107.

As illustrated in exemplary FIG. 1, the node controller 103-1 is communicatively coupled to and/or associated with the processors 105-1 and 105-2, and the memories 107-1 and 107-2); and the node controller 103-2 is communicatively coupled to and/or associated with the processors 105-3 and 105-4, and the memories 107-3 and 107-4. It should be understood that each of the node controllers 103 can be communicatively coupled to and/or associated with any number of local processors and/or memories. In some embodiments, the node controllers 103 are communicatively coupled and/or connected to their respective, local processors via interconnects such as UPI links.

The node controllers 103 can be communicatively coupled to and/or interconnected with one another via the fabric 101 (or "fabric interconnect") and, the processors 105 can communicate with one another therethrough. The fabric 101 can include one or more direct and/or switched interconnects. For example, in some embodiments, the fabric 101 can include direct interconnections between the node controllers 103-1 and 103-2 (e.g., to minimize latency). Accordingly, the fabric 101 can be used to transmit data and/or messages between or among one or more of the node controllers 103 and/or processors 105. Such communications can include, for example, memory access requests, for example, to read or write from or to memory or cache blocks, in which case the node controllers 103 can provide or facilitate cache coherency.

It should be understood that the components (e.g., node controllers 103, processors 105, memories 107) of the system 100 can be physically housed together or separately. For instance, the exemplary components of the system 100 illustrated in FIG. 1 can be provided in a single chassis or in multiple chasses or in a single package. As described above, the system 100 can include any number of node controllers, processors, and/or memories beyond those illustrated in FIG. 1, which can be housed together or separately. Moreover, in some embodiments, the system 100 can include additional systems or sub-systems that are formed of node controllers, processors and/or memories, and are communicatively coupled to the fabric 101, through which communications with the node controllers 103 and processors 105 can be achieved.

Figure 2:
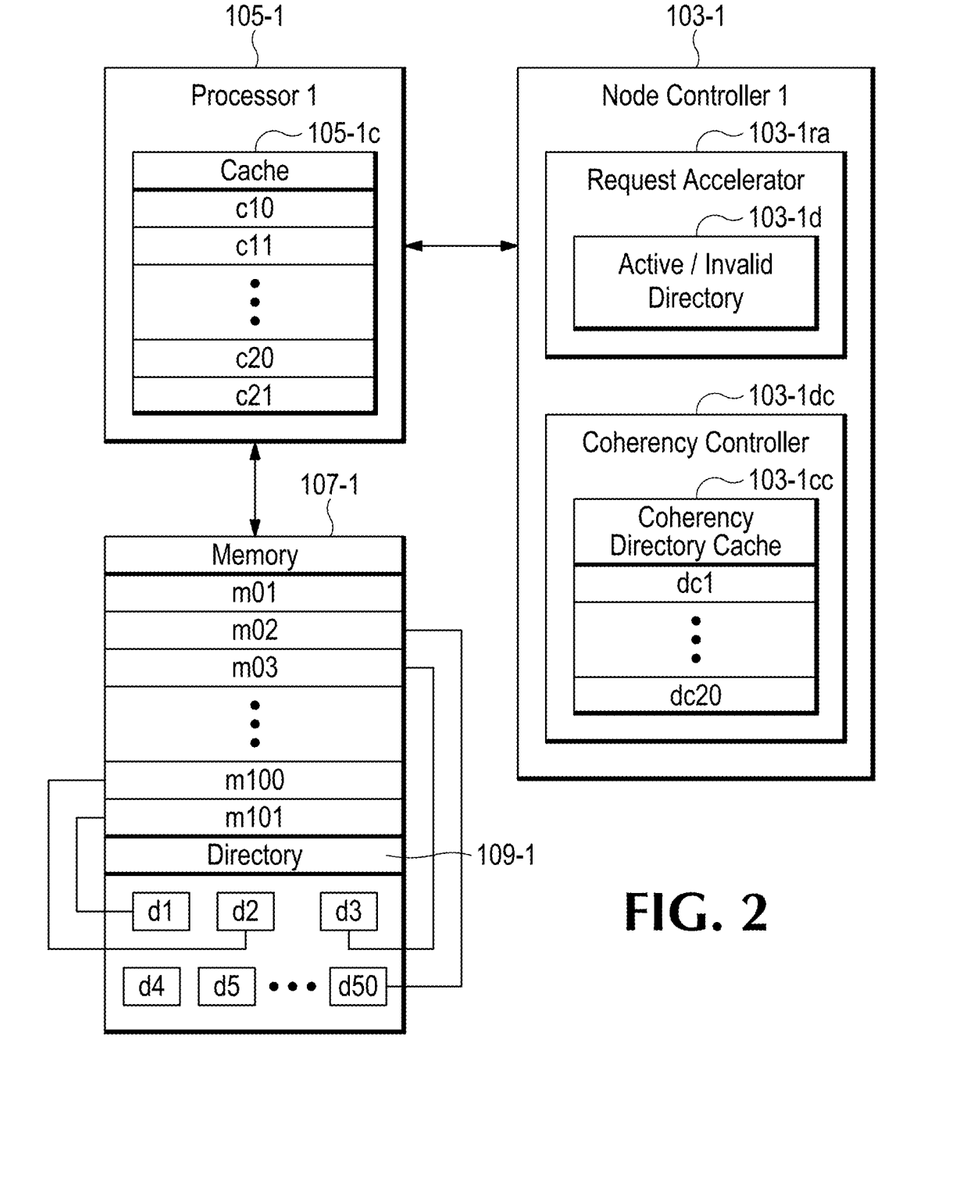
FIG. 2 is a diagram illustrating an exemplary embodiment of portions of the shared memory system of FIG. 1, including a coherency directory and a coherency directory cache.

FIG. 2 illustrates an example embodiment of some aspects of the system 100, namely the processor 105-1, memory 107-1 and node controller 103-1. As shown, the memory 107-1 and the processor 105-1, are associated with and/or communicatively coupled with one another; and the processor 105-1 and the node controller 103-1 are associated with and/or communicatively coupled with one another. It should be understood that all or some of the features described below for exemplary purposes with reference to the processor 105-1, memory 107-1 and node controller 103-1, can be included or implemented in whole or in part in other processors (e.g., processors 105-2 to 105-4), memories (e.g., memories 107-2 to 107-4) and node controllers (e.g., node controller 103-1), respectively.

As known to those of skill in the art, each of the memories 107 can be formed of defined memory blocks that make up memory regions. The memories, memory blocks and memory regions can be of any size. As shown in FIG. 2, the memory 107-1 can include exemplary memory blocks m01 to m101. The memories 107 can be used to store any type of data, including software such as operating systems (OSs), hypervisors and other applications. The software stored on the memories 107 is made up of processes and/or threads that can be executed concurrently and share resources such as memory (e.g., memories 107) and processors (e.g., processors 105). Each process and/or thread, when executed, can cause requests and responses (e.g., write, read) to be transmitted among the processors 105 (and/or the node controllers 103-1 and 103-2). Sharing memory enables remote processors to access (e.g., read or write) data stored in a local memory of a local processor, thereby requiring the implementation of cache coherency to ensure that the shared data remains uniform or coherent to all processors in the system.

Data stored in the memories 107 can be cached by one or more of the processors 105 into their respective caches 105c. When data stored in the memories 107 is cached, a copy of that data is stored in one of the caches 105c, in blocks of fixed size referred to as cache lines or cache blocks. Each cache line is stored in a corresponding cache entry in one or more caches. A cache entry can include several types of information, such as the data copied from the memories 107 that forms the cache line, as well as information for identifying the location of that data within the memory 107 (e.g., tag). As mentioned, in a multiprocessor, shared memory system such as the system 100, it is possible for multiple copies of data to be cached and stored in multiple of the caches 105c.

For example, as shown in FIG. 2, the processor 105-1 includes the cache 105-1c. The cache 105-1c can include cache entries (or cache blocks), such as the entries c10 to c21 illustrated in FIG. 2. Data stored in the memory 107-1 (e.g., in memory block m01) can be cached in the cache of its respective or local processor 105-1, as well as in the caches (e.g., 105-2c, 105-3c and/or 105-4c) of other remote processors. In such cases, access to that shared data is coordinated to provide coherency. For instance, when a data block is shared and a processor wants to update it, the processor requests exclusive ownership of the block. During the process of obtaining exclusive ownership, the shared copies of that block are moved to the invalid state. The block is in turn updated, the exclusive ownership is released back to the shared state, and other processors can then once again obtain a shared copy of the memory block. It should be understood that, although not explicitly illustrated in FIG. 2, the cache entries c10-21 can have stored therein cached copies of portions (e.g., memory blocks or cache line sized memory blocks) of the local memory 107-1 or of remote memories 107-2 to 107-4.

In some embodiments, coherency protocols employ directories to track and/or store information about shared data, including, for example, the state and ownership of that data. Moreover, as also described in further detail below, directories can be stored in one or more components or devices based on the type of memory category. Directories can be full directories that track or include information (e.g., state, ownership) corresponding to all of their respective memories 107 (and the shared data stored therein); or they can be partial directories that track or include information (e.g., state, ownership) corresponding to only a subset of their respective memories 107 (and the shared data stored therein). For example, in some embodiments, a directory can track the state and ownership information of only certain of their memory blocks or cache lines.

Each of the memories 107 can include or be associated with a respective coherency directory. For example, as shown in FIG. 2, the memory 107-1 is associated with a coherency directory 109-1. In some embodiments, the directory 109-1 can be stored in the memory 107-1, which is part of the shared system memory 107sm. However, the directory 109-1 can alternatively be stored in an unshared portion of the memory 107-1 and/or in a separate memory associated and/or communicatively coupled with the memory 107-1 which is not part of the shared memory 107sm.

The coherency directory 109-1 is made up of directory entries, including the exemplary entries d1 to d50 illustrated in FIG. 2. In some embodiments, each of the directory entries corresponds to and tracks information associated with a cache line size memory block of the memory 107-1. Moreover, in some embodiments, each of the directory entries includes state and ownership information associated with a portion of the memory 107-1, as well as a tag or the like. The tag can be an identifier, pointer or the like that associates the directory entry with a memory block. That is, the tag in a directory entry indicates which memory block the state and ownership information of that directory entry correspond to. The tag or pointer may be implied based on how the directory entry information is organized. The state information indicates the state of the memory block. It should be understood that the types of states that are tracked can vary based on the coherency protocol.

As known to those of skill in the art, the modified state indicates that data from a memory block is cached and it is dirty—meaning that the cached data has been modified in the cache and is therefore, inconsistent or does not match the original value stored in the system memory. The exclusive state indicates that data from a memory block is only cached in one cache, but it is clean—meaning that it matches the original value stored in the system memory. The shared state indicates that the data from a memory block may be cached in other caches and it is clean—meaning that the cached copies match the original value stored in the main memory. The invalid state indicates that data from a memory block is not cached in the cache of any processor (local or remote).

The ownership information indicates (1) the processor that owns a memory block or cache line, in instances when the state of that memory block in the directory is a modified or exclusive state; or (2) the processor or the processors that share a memory block (e.g., have a cached copy), in instances when the state of that memory block in the directory is a shared state. The ownership information can be a pointer, bit or other identifier of the owner and/or sharer processors. It should be understood that the actual information stored as state and ownership information may vary, depending on the coherency protocol that is used.

Still with reference to FIG. 2, the node controller 103-1 includes a request accelerator 103-1ra and a directory cache controller 103-1cc. In some embodiments, the node controller 103-1 (and/or its request accelerator 13-1ra and directory cache controller 103-1cc) can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. In some embodiments, cache coherency management such as managing the ejection of coherency directory cache entries is performed by a hardware sequencer, hardware state machine and/or other circuits or hardware components. Though, it should be understood that these functions can also be provided through processor implemented instructions, as known to those of skill in the art. The node controllers 103-1 can also include one or more memories or memory devices, such as ROM, RAM, EEPROM, flash memory, registers and other storage elements or any other form of storage medium known to those of skill in the art.

In some embodiments, each of the request accelerator 103-1ra and directory cache controller 103-1cc can be or include computer hardware (e.g., sequencer, state machine) such as a circuit that includes logic and memory devices or storage elements. The logic is configured to execute or perform one or more of the functions, processes and/or methods described herein, including those for providing cache coherency management and management of the ejection of coherency directory entries. The memory devices or storage elements can be used to store, for example, an active/invalid directory 103-1d and a coherency directory cache 103-1dc, described in further detail below.

As illustrated, the coherency controller 103-1cc includes a coherency directory cache 103-1dc (or "directory cache" or "coherency directory cache"). The directory cache 103-1dc includes or stores, in directory cache entries, copies of data stored in directory entries (e.g., tag, state, ownership) of the directory 109-1. As known to those of skill in the art, because the size or storage capacity of the directory cache can often be much smaller than that of the corresponding memory and/or of the corresponding directory, the directory cache is configured to store only copies of a subset of the directory entries from the directory. That way, the device or component (e.g., node controller 103-1) that includes and/or manages the directory cache can have or require fewer resources (e.g., power, area, memory,) than the devices or components (e.g., processor 105-1, memory 107-1) that include and/or manage the coherency directory.

Accordingly, in some embodiments, the coherency directory cache 103-1dc is smaller than the coherency directory 109-1. The directory cache 103-1dc therefore includes copies of only a subset of the directory entries in the directory 109-1. As described in further detail below, the subset of directory entries cached in the directory cache 103-1dc is optimized to include data from memory blocks that would be of most value if accessed with higher efficiency, such as data or memory blocks that have been recently used, are currently being used, and/or are more likely to soon be used (as opposed to data that has not been used for a large period of time relative to other data).

The request accelerator 103-1ra includes an active/invalid directory 103-1d. The active/invalid directory 103-1d can be a look up table or the like that stores information relating to how many (and/or which) memory blocks in the corresponding memories are invalid (e.g., in an invalid state) and/or are active (e.g., not invalid; in a shared, modified or exclusive state). In other words, the information stored in the active/invalid directory 103-1d indicates or can be used to determine whether or not memory blocks are being accessed by local or remote processors. As described in further detail below, that information can be used to determine the value of maintaining a directory entry cached in the directory cache 103-1da In some embodiments, the active and invalid information of the directory 103-1d is based on or corresponds to the state information stored in the memory 107-1 for each of the memory blocks (e.g., memory blocks m01 to m101).

In some embodiments, for purposes of reducing the storage requirements of the node controller 103-1 and/or the directory 103-1ra, the active/invalids directory 103-1d stores the active and/or invalid data on a per memory region basis. That is, rather than storing or tracking which memory blocks are active and which memory blocks are inactive, the directory 103-1d can store information (e.g., tracking information) corresponding to memory regions. For example, for each memory region (which can be of any size) of the memory 107-1 that is made up of n number of memory blocks (e.g., blocks m01 to m101), the active/invalids directory 103-1d can store a count value of the number of invalid (or active) memory blocks among the n number of blocks. It should be understood that, while potentially less precise than accessing state information in a directory for any specific memory block, the information in the active/invalid directory 103-1d can be quickly accessed and decisions based on that information can be made with more efficiency. For instance, as described in further detail below, it is possible to determine if a specific memory block is in an invalid state if the memory address of that block falls within a memory address range having an invalid count value equal to n (wherein n represents the total number of blocks within that region); or alternatively, an active count value equal to 0, meaning that all memory blocks within that region are inactive.

It should be understood that the active/invalid directory 103-1 and coherency directory cache 103-1dc are described above with reference to the memory 107-1 and the directory 109-1 for purposes of illustration. However, the active/invalid directory 103-1 and coherency directory cache 103-1*dc* can include information of and/or be associated with any other memories or directories that are deemed local to the node controller 103-1—namely, for example, the memory 107-2 and its corresponding coherency directory.

The use of the active/invalid directory 103-1*d* and the coherency directory cache 103-*cc* to provide more efficient cache coherency by managing the ejection of directory cache entries will now be described with reference to FIGS. 3 and 4.

Figure 3:
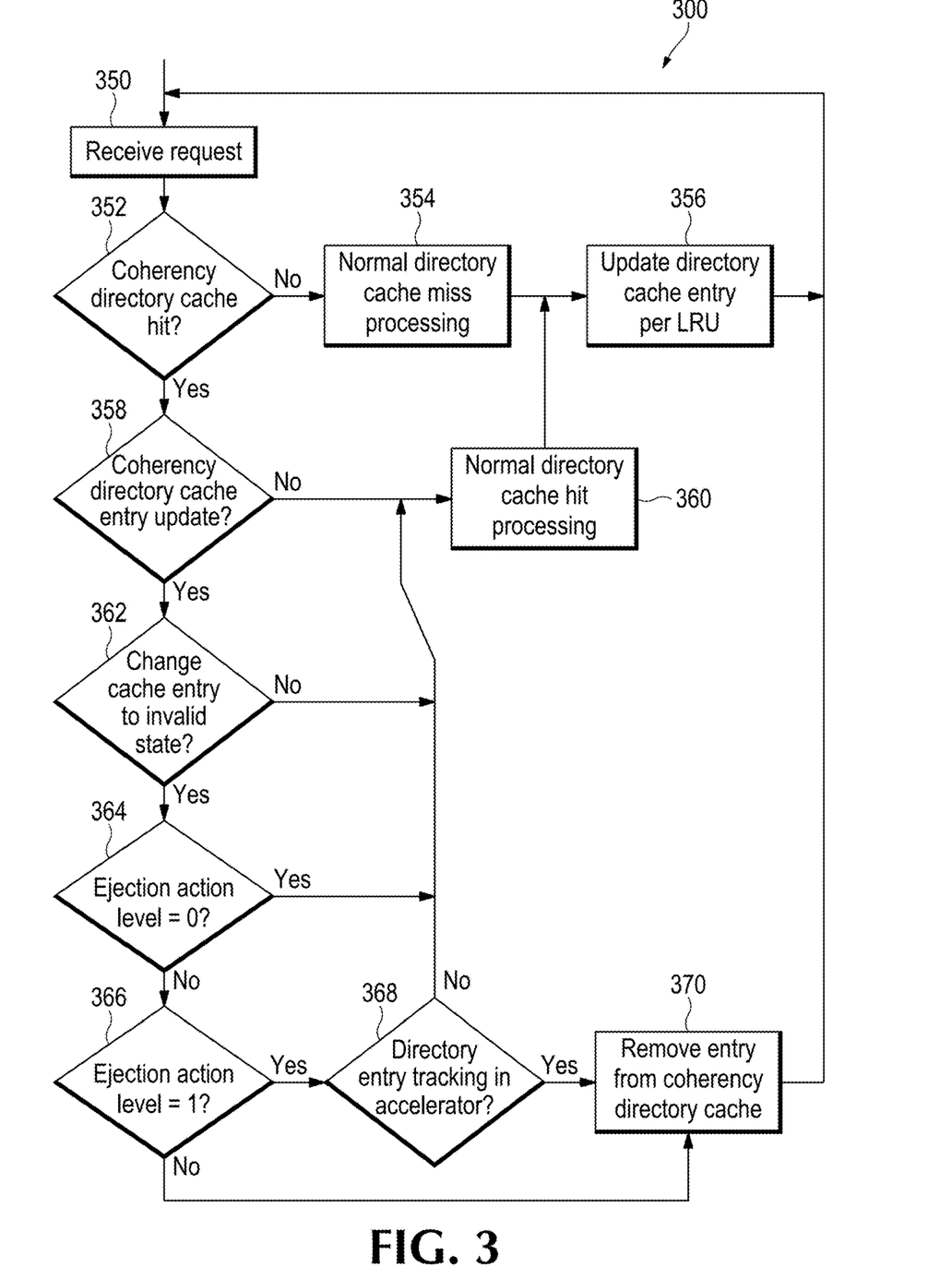
FIG. 3 is a flow chart illustrating an exemplary embodiment of a process for providing aspects of cache coherency including the management of the ejection of coherency directory cache entries.

FIG. 3 is a flow chart illustrating an exemplary process 300 for managing aspects of cache coherency, including the ejection of directory cache entries. The process 300 is described with reference to FIG. 4, which illustrates exemplary embodiments of the directory 109-1, the active/invalids count directory 103-1*d* and the coherency directory cache 103-1*dc* described above with reference to FIG. 2. The directory 109-1, the active/invalids count directory 103-1*d* and the coherency directory cache 103-1*dc* illustrates exemplary portions of the data stored therein immediately prior to step 350 of FIG. 3.

Figure 4:
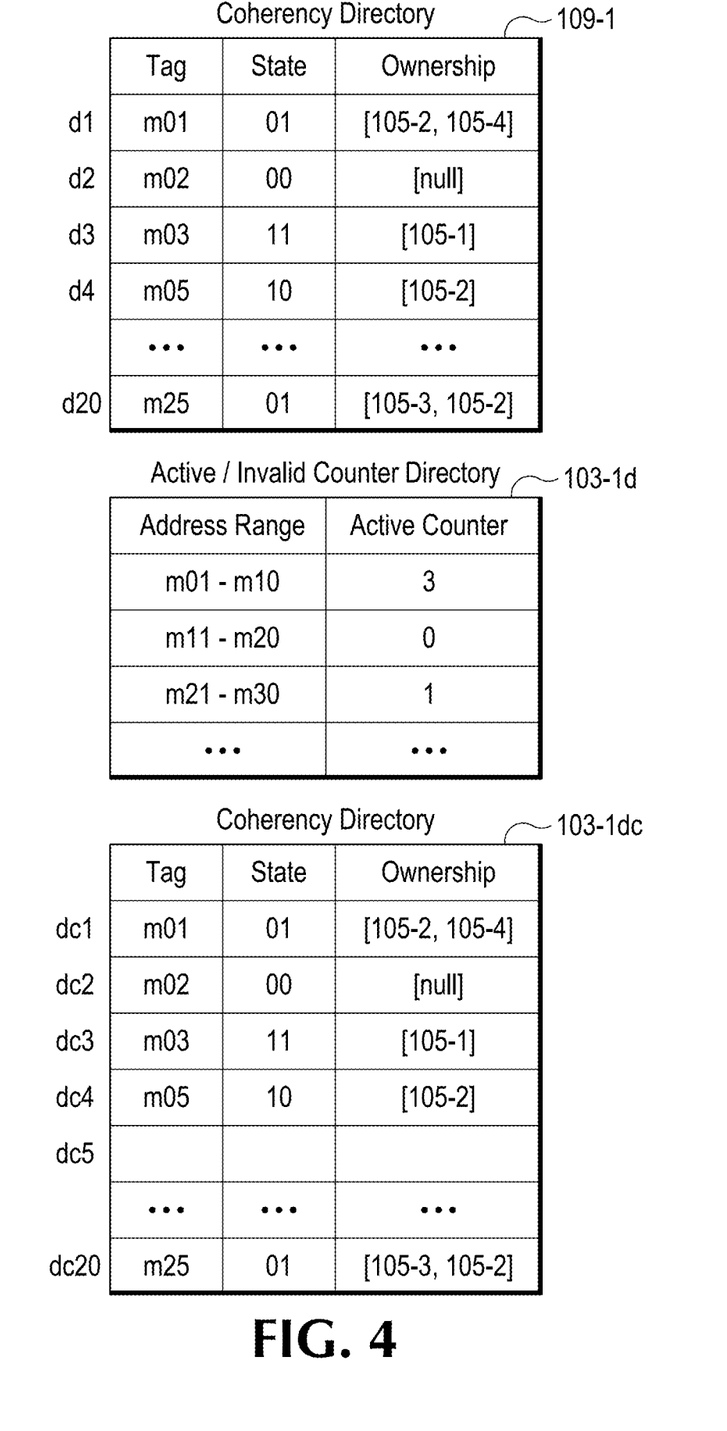
FIG. 4 is a diagram illustrating exemplary embodiments of a coherency directory, an active/invalid tracker, and a coherency directory cache.

The coherency directory 109-1 includes directory entries, an exemplary subset of which are shown in FIG. 4. Each of the entries (e.g., d1, d2, etc.) includes a tag (stored in a memory or implied by the memory location of state and ownership information), state and ownership. As known to those of skill in the art, the tag can be used to identify the memory block for which the directory entry tracks corresponding state and ownership information. For example, the entry d1 includes state and ownership information for the memory block m01. It should be understood that the information included in the tag can vary, and in some embodiments can include a portion of the memory address (e.g., in the memory 107-1) of the corresponding memory block. Moreover, the directory entry d1 includes the state information of the corresponding memory block m01, which in some embodiments can be or include: invalid, modified, exclusive, shared. The state can be tracked, for example, using one or more state bits that encode the state of the memory block. In FIG. 4, for purposes of illustration, cache states correspond to state bits as follows: 00=invalid; 01=shared; 10=modified; 11=exclusive. Of course, it should be understood that any value or any type of information can be used to track the state of the memory block. It should also be understood that some, all or altogether different memory block states may be used. For example, the directory entry d1 indicates that the memory block m01 in the memory 107-1 is being shared—e.g. because of the '01' value stored in the state information.

Additionally, the ownership information tracks which processors in the multiprocessor system 100 are sharing (or have ownership of) the memory block. As known to those of skill in the art, the ownership information can include any type of data, including a pointer, a processor identifier, a sharing bit vector in which each bit corresponds to each processor and encodes whether or not they are sharing (or owning) the memory block. This sharing vector may or may not be precise in identifying shared ownership. For purposes of illustration, in FIG. 4, the ownership information of the directory entry d1 includes 105-2 and 105-4, which are two of the processors in the system 100. As indicated, the identifiers 105-2 and 105-4 are merely examples of the information that can be tracked in the directory. As shown for the directory entry d2, the ownership information is null, indicating that no processors own or are sharing the memory block m02 (which is in alignment with the invalid state of that memory block, as indicated by the '00' state value stored in the entry d2).

Still with reference to FIG. 4, the active/invalid count directory 103-1 tracks the number of active and/or invalid memory blocks in its local memories (e.g., 107-1, 107-2). In some embodiments, the invalid count directory 103-1 (e.g., tracker) includes information (e.g., tracking information or counter) for each memory address range made up of n memory blocks. It should be understood that the number of memory blocks in each memory address range can vary. For purposes of illustration, in FIG. 4, tracking information is used for each memory address range made up of ten memory blocks. For example, one set of tracking information (shown first in the directory 103-1*d*) corresponds to the memory address range starting at memory blocks m01 and ending at memory block m10, and tracks how many active memory blocks are within that region. If the active tracker is equal to 0, it can be determined or concluded that none of the memory blocks within the region are being shared with or owned by remote processors, and therefore, all of the memory blocks in that region are in an invalid state. On the other hand, if the active tracker is greater than 0, it can be determined or concluded that some of the memory blocks are being shared (e.g., are in a shared, modified or exclusive state). In some embodiments, the tracker need not track the exact number of memory blocks that are being shared. The tracking information can be updated as memory access requests are received by the node controller 103-1 and processed through the request accelerator 103-1*ra*. That is, the node controller 103-1 (or the accelerator 103-1*ra* thereof) can increase or decrease the tracker depending on the type of request that it received. As described in further detail below, this information can be used to determine what information should be tracked and/or maintained in the coherency directory cache 103-1*dc*.

The coherency directory cache 103-1*d* includes and/or is made up of a portion of the directory entries in the coherency directory 109-1. For example, each of the directory cache entries (e.g., dc1, dc2, . . . , dc20, etc.) of the coherency directory cache 103-1*dc* includes a copy the tag, state and ownership information of the directory entries (e.g., d1, d2, . . . , d25, etc.). for example, the directory cache entry dc1 includes a copy of the data stored in the directory entry d2, which correspond to the memory block m2; and the directory cache entry dc2 includes a copy of the data stored in the directory entry d1, which corresponds to the memory block m1.

As mentioned above, the coherency directory cache 103-1*dc* stores copies of only a subset of the directory entries in the coherency directory 109-1. As a result, the resources (e.g., storage, power, area, etc.) needed for or consumed by the coherency directory cache 103-1*dc* can be minimal compared to the size of the directory 109-1 and the corresponding memory 107-1. To maximize the usefulness of the directory cache 103-1*dc*, the entries from the coherency directory 109-1 that are cached in the coherency directory cache 103-1*dc* at a particular time (including the ejection of directory cache entries corresponding to coherency directory entries) are managed by the node controller 103-1 as described herein and below with reference to FIG. 3.

At step 350 of FIG. 3, the node controller 103-1 receives a request relating to a memory block in one of its corresponding memories, such as the memory 107-1. In some embodiments, the request can be a request to access or change the state and/or ownership information of a memory block, or a request that otherwise causes or triggers accessing or changing the state and/or ownership information of a memory block. The request can originate from another processor in the system 100, and can be transmitted to the node controller 103-1 by or through the node controller of the requestor processor. As known to those of skill in the art, the request can be transmitted for various purposes, including to identify which processors have ownership or shared access to a memory block such that the requestor processor can retrieve data or send updates to the owner or sharer processors and provide coherency. The request received at step 350 can include various types of data, structured in different ways, as known to those of skill in the art. In some embodiments, the request includes the memory address of the memory block, the type of request (e.g., the command or instruction of the request), and any other data needed to process the request.

In turn, at step 352, based at least in part on the information included in the request, the node controller 103-1 determines if there is a directory cache hit (or, alternatively, detect a cache hit (or "hit") or a directory cache miss (or "miss")) in the coherency directory cache 103-1dc. As known, a cache hit indicates that the memory block referenced in the request (e.g., based on the memory address included in the request) is at that time being tracked by the coherency directory cache 103-1dc. That is, at that time, the coherency directory cache 103-1dc includes an entry that has a copy of state and ownership information of that memory block (copied from the directory 109-1c). On the other hand, if a hit is not detected and/or if a miss is detected, the directory cache 103-1dc is not at that time tracking the state and ownership of that memory block. Though, it should be understood that the memory block can be tracked at that time by the coherency directory 109-1 (e.g., on the memory 107-1).

If the node controller 103-1 does not detect a hit (or detects a miss) at step 352, it, in turn, processes the request under normal or default coherency directory cache processing. In some embodiments, normal coherency directory cache processing when a directory cache miss is detected can include fetching data (e.g., state and ownership information) from, for example, the entry in the directory 109-1 that corresponds to the memory block referenced in the request, and copying that data into the directory cache 103-1dc. In this way, the state and ownership information that was not stored in the directory cache at step 352 will be stored in the directory cache 103-1dc following step 354. Moreover, in some embodiments, the normal miss processing can include ejecting or removing a directory cache entry from the directory cache, to enable the copying or addition of data of a new directory entry thereto. As described in further detail below, such processing can be performed in accordance with a cache replacement algorithm. The node controller 103-1 can, in turn, respond to the request (e.g., with the state and/or ownership information of the memory block referenced in the request).

For example, with reference to FIG. 4, the node controller 103-1 can receive a request including a memory address corresponding to the memory block m32 of the memory 107-1. In some embodiments, the memory block m32 may not have its state and ownership information tracked by the coherency directory cache, causing a miss to be detected at step 352. The directory cache miss of step 352 causes the node controller 103-1 to perform normal coherency directory cache processing of miss scenarios. That is, the node controller 103-1 can retrieve the state and ownership information stored in a directory entry of the coherency directory 109-1, and store a copy of that information in an entry of the coherency directory cache 103-1dc. If needed, the node controller 103-1 can eject or remove a directory cache entry from the directory cache, to make room for another directory entry to be copied into that directory cache entry. The node controller 103-1 can in turn transmit the state and ownership information to the requestor processor or perform the requested action (e.g., via its corresponding node controller). The requested actions may include changing state or ownership information, sending data, receiving data or other actions know to one skilled in the art.

In some embodiments, at step 354, the state and ownership information newly copied into the directory cache 103-1dc can be added to an unused directory cache entry. However, in some embodiments, when the directory cache 103-1dc does not have any unused entries, the node controller 103-1 applies a cache replacement algorithm (or policy) at step 352 to determine which cache entry to eject or clear for other data to be added therein. In some embodiments, the cache replacement algorithm employed by the node controller 103-1 can be a least recently used (LRU) algorithm. The LRU algorithm causes the "least recently used" entry in the directory cache 103-1dc to be ejected or discarded to enable new information to be copied therein—meaning the information that was retrieved from the directory 109-1. The least recently used entry refers to the entry that was accessed least recently in time. It should be understood that other cache replacement algorithms known to those of skill in the art can be employed by the node controller 103-1.

At step 356, the node controller 103-1 updates directory cache replacement metrics in the directory cache 103-1dc. A replacement metric can refer to any information that is used by the node controller 103-1 to determine the order in which directory cache entries are to be ejected or replaced, when needed. This can be, for instance, a value indicating the age of each entry (e.g., an age bit), a value indicating the place of each entry in a queue (e.g., ranking bit), the pointer to a next entry in a sequence of entries (e.g., a linked list), and the like. For example, in some embodiments in which an LRU replacement algorithm is used, the node controller 103-1 updates the replacement metric of each of the entries of the directory cache 103-1dc. The update can include increasing the age, ranking or pointer, such that the remaining entry in the directory cache 103-1dc that was accessed the furthest back in time is assigned as the LRU entry, and will therefore be the next entry to be removed when needed.

In turn, the node controller 103-1 returns to step 350 to await the receipt of additional requests.

Returning to step 352, if the node controller 103-1 detects a directory cache hit, it in turn determines at step 358 whether an entry in the coherency directory cache 103-1dc is to be updated. As mentioned, a hit indicates that the directory cache 103-1dc includes a copy of the state and ownership information of the memory block referenced in the request. Specifically, at step 358, the node controller 103-1 checks the request received at step 350 and determines whether it includes instructions to (or otherwise requires) change the state and/or ownership information of the memory block referenced in the request.

If it is determined at step 358 that the state in the coherency directory cache entry corresponding to the memory block referenced in the request does not have to be updated, the node controller 103-1 performs normal coherency directory cache processing of detected hits, at step 360. In some embodiments, the processing of step 360 can include transmitting the state and/or ownership information of the memory block to the requestor or perform the requested action. The requested actions may include sending data, receiving data or other actions know to one skilled in the art. Notably, this information can be efficiently transmitted to the requestor or action taken based on the contents of the directory cache 103-1*dc*, without needing to fetch it from the directory 109-1. In turn, the directory cache can update the replacement metric information in the directory cache 103-1*dc*, at step 356, and return to step 350 to await other requests.

If it is determined at step 358 that the coherency directory cache entry of the memory block referenced in the request is to be updated, the node controller 103-1 proceeds to step 362. At step 362, the node controller 103-1 determines whether the change to be performed in the cache entry of the memory block referenced in the request is to update the state of that memory block to invalid—to indicate that the memory block is not being shared with other processors. If it is determined that the change to the entry is something other than to change the state to invalid, the node controller 103-1 performs normal directory cache hit processing at step 360. In some embodiments, the processing of step 360 can include transmitting the updated or changed information to the requestor and/or sending an acknowledgment of the change or other actions known to one skilled in the art.

On the other hand, if it is determined at step 362 that the directory cache entry of the memory block is to be changed to reflect an invalid state, the node controller 103-1 employs a cache ejection algorithm as shown starting at step 364. That is, the node controller 103-1 applies a set of policy rules that trigger the manner in which (and when) entries are to be ejected (e.g., removed, discarded) from the directory cache 103-1*dc* when the addition of a new entry is not being made and the directory cache does not require this action. In some embodiments, the policy rules can be applied based on an ejection action level corresponding to the directory cache entry. Each action level is or includes a value that indicates the respective ejection rule to be applied. The ejection action level can be assigned to and tracked for each of the directory cache entries of the directory cache 103-1*dc*, can be determined for each of the entries in real-time, or can be applied across part or all of the coherency directory cache by the node controller 103-1. For purposes of illustration, three action levels numbered 0 to 2 will be discussed.

At step 364, the node controller determines the ejection action level of the directory cache entry that includes the state and ownership information of the memory block referenced in the request. If the ejection action level corresponds to the first rule among the ejection policy rules (e.g., action level=0), the node controller 103-1 performs normal coherency directory cache hit processing at step 360. As described above, this can include updating the state stored in the directory cache entry, responding to the request, and setting or programming the entry for ejection or removal based on the replacement algorithm rules (e.g., LRU). That is, the directory cache entry may not need to be immediately removed, and will instead be removed from the directory cache 103-1*dc* when it becomes the least recently used entry, as described above. It should be noted, that after the current directory cache access this entry will be last on the replacement list as it is the most recently used.

On the other hand, if the node controller 103-1 determines at step 364 that the ejection action level does not correspond to the first rule (e.g., action level !=0), the node controller moves on to step 366. At step 366, the node controller 103-1 determines whether the action level of the directory cache entry corresponds to the second rule among the ejection policy rules (e.g., action level=1). If it is determined that the ejection action level for the entry does correspond to the second rule, the node controller in turn determines whether certain tracking requirements (or base conditions) are met before determining how to manage the ejection of the cache entry. As described in further detail below tracking requirements can include the requirement that the state of the memory block corresponding to the directory cache entry is being tracked in the node controller by a component or structure other than the directory cache.

To this end, at step 368 whether the memory block of the coherency directory entry is being tracked as invalid by the request accelerator. For example, as described above, the request accelerator 103-1*ra* can include an active/invalid directory 103-1*d* that tracks information about which memory blocks are in an invalid state or not in an invalid state (e.g., they are "active"). In some embodiments, the tracker or tracking information in the active/invalid count directory indicates or can be used to determine how many (or all, none or some) of the memory blocks in a memory region are in an invalid state (e.g., not shared or cached by processors). However, in some embodiments, the tracking information does not indicate if a specific memory block is in an invalid state. Accordingly, if at step 368, the node controller 103-1 determines based on the active/invalid count directory 103-1*d* of the request accelerator 103-1*ra* or by other methods that the memory block of the directory cache entry is tracked as being in an invalid state, the node controller 103-1 removes the directory cache entry from the directory cache 103-1*dc* at step 370. The node controller 103-1 can make such a determination, for example, if the tracking information for the memory region in which the memory block is contained indicates that all of the memory blocks within that region are invalid or by other methods. Otherwise, if the node controller 103-1 cannot make such a determination at step 368, the node controller 103-1 performs normal directory cache hit processing at step 360, as described above. That is, under the normal processing of step 360, the node controller 103-1 normally does not remove the directory cache entry from the directory cache 103-1*dc*.

It should be understood that the node controller 103-1 removes the directory cache entry at step 370 based on the fact that the request accelerator 103-1*ra* has tracked and identified the memory block associated with the directory cache entry as being invalid. Because that memory block is in an invalid state, the directory cache need not continue to store that entry, and rather makes way for other memory blocks that are active (e.g., not in an inactive state). Removal of the cache entry from the coherency directory cache 103-1*dc* can include deleting the data stored within that cache entry, including for instance the tag, state and ownership information of the memory block.

Returning to step 366, if the node controller 103-1 does not determine that the action level of the directory cache entry corresponds to the second rule among the ejection policy rules (e.g., action level !=1), the node controller 103-1 remove, at step 370, the directory cache entry associated with the memory block referenced in the request from the directory cache 103-1*dc*. It should be understood that, although not illustrated in FIG. 3, the node controller 103-1 can make an explicit determination as to whether the action level of the directory cache entry corresponds to the third rule (e.g., action level=2), as opposed to defaulting to the third rule when neither the first nor second rule are triggered at steps 364 and 366.

In turn, after directory cache entry is removed from the coherency directory cache 103-1*dc* the newly blank or unused directory cache entry of the directory cache 103-1*dc* can be used to store a copy of a directory entry corresponding to a newly added memory block that is active. Moreover, in turn, the node controller 103-1 returns to step 350, where it can await further requests for processing.

Figure 5:
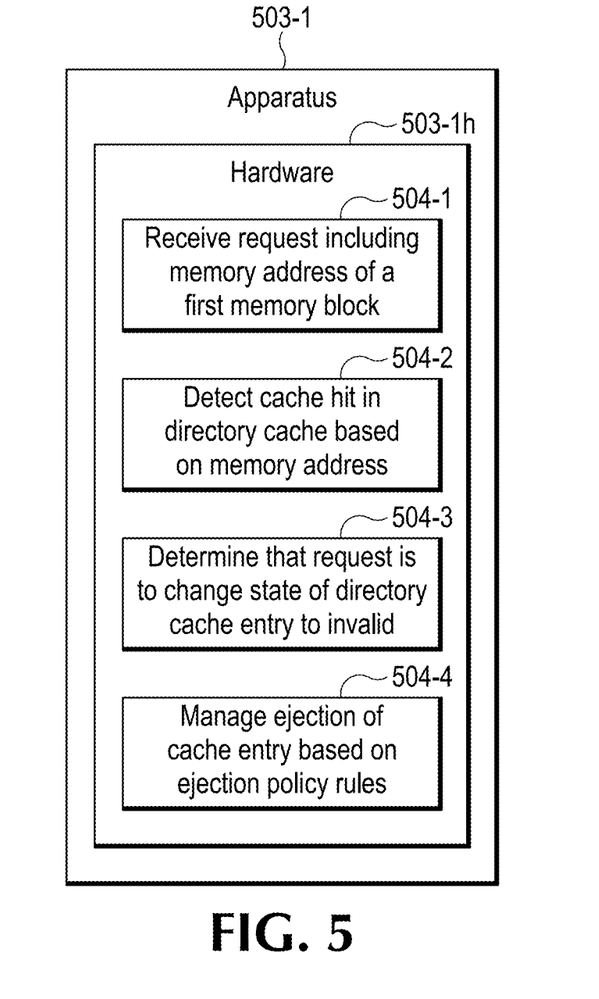
FIG. 5 is a diagram illustrating an exemplary embodiment of a node controller of the shared memory system of FIG. 1.

FIG. 5 illustrates an apparatus 503-1 for managing cache coherency including managing the ejection of entries from a coherency directory cache. The apparatus 503-1 includes hardware or hardware components 503-1*h* (e.g., circuits, hardware logic, storage elements). The hardware 503-1*h* is configured to perform or execute methods, functions and/or processes as described herein. In some embodiments, these methods, functions and/or processes can be embodied as machine readable instructions or code stored on a computer readable medium such as RAM, ROM, EPROM, EEPROM of the apparatus 503-1. These instructions can be executed by one or multiple processors of the apparatus 503-1.

As shown in FIG. 5, the hardware 503-1*h* can include hardware 504-1 for receiving a request including a memory address. The memory address can be of a first memory block in a memory. The memory can include one or more memory devices that are part of a shared memory. Tracking information can be used to track the number of active memory blocks in memory regions of the memory. Moreover, the hardware 503-1*h* can include hardware 504-2 for detecting a cache hit in a coherency directory cache. The coherency directory cache can include a plurality of directory cache entries. Each of the directory cache entries can be configured to store a copy of a directory entry from a coherency directory. Each of the directory entries is configured to include state and ownership information of a respective memory block of the memory. The cache hit can be determined based on the memory address included in the request. In some embodiments, the cache hit can indicate that, at that time, the coherency directory cache includes a copy of a directory entry associated with the first memory block.

The hardware 503-1*h* can also include hardware 504-3 for determining that the request is a request to change the state of the first memory block in a first directory cache entry from among a plurality of cache entries to an invalid state. Moreover, the hardware 503-1*h* can include hardware 504-4 for managing the ejection of the first directory cache entry from the coherency directory cache based on one of a plurality of ejection policy rules. In some embodiments, the plurality of ejection policy rules include first, second and third ejection policy rules. Under the first ejection policy rule, the first directory cache entry is optionally ejected based on requirements of a directory cache replacement algorithm. Under the second ejection policy rule, the first directory cache entry is ejected based on one or more tracking requirements. Under the third ejection policy rule, the first directory cache entry is ejected independent of other requirements.

The invention claimed is:

1. An apparatus, comprising:
 one or more memory devices including:
  one or more trackers indicating if memory blocks are in an active state within a respective memory region of a memory; and
  a coherency directory cache comprising a plurality of directory cache entries, each of the directory cache entries being configured to store a copy of a directory entry from a coherency directory, and each of the directory entries being configured to include state and ownership information of a respective memory block of the memory; and
 one or more hardware components configured to:
  receive a request including a memory address of a first memory block;
  detect a cache hit in the coherency directory cache based on the memory address included in the request;
  determine that the request is to change the state of the first memory block in a respective first directory cache entry among the plurality of directory cache entries to an invalid state; and
  manage the ejection of the first directory cache entry from the coherency directory cache based on one or more ejection policy rules, wherein the policy rules include:
   a first ejection policy rule, wherein the first directory cache entry is optionally ejected based on requirements of a directory cache replacement algorithm;
   a second ejection policy rule, wherein the first directory cache entry is ejected based on one or more tracking requirements; and
   a third ejection policy rule, wherein the first directory cache entry is ejected independent of other requirements.

2. The apparatus of claim 1, wherein the directory cache replacement algorithm is a least recently used (LRU) algorithm wherein the first directory cache entry is ejected based on respective replacement metrics of the plurality of directory cache entries.

3. The apparatus of claim 2, wherein the replacement metrics indicate the age, ranking or position of each of the plurality of directory cache entries relative to one another based on a measure of the amount of time since each respective memory block of the plurality of directory cache entries was last accessed.

4. The apparatus of claim 3, wherein, for the first ejection policy rule, the first directory cache entry is ejected when an uncached one of the directory entries from the coherency directory needs to be cached and none of the plurality of directory cache entries are unused.

5. The apparatus of claim 2, wherein the tracking requirements require that the first directory cache entry be in an invalid state as determined based on the trackers associated with the memory region that includes the first memory block.

6. The apparatus of claim 5, wherein the one or more policy rules for managing the ejection of the first directory cache entry is determined based on an ejection action level value associated with the first memory block.

7. The apparatus of claim 6, wherein managing the ejection of the first directory cache entry includes ejecting the first directory cache entry, the ejecting including removing from the first directory cache entry the copy of the directory entry corresponding to the first directory cache entry.

8. The apparatus of claim 7, the one or more hardware components being configured to manage requests relating to at least the memory, the memory including one or more memory devices forming a shared memory accessible by one or more processors.

9. The apparatus of claim 8, wherein the inactive state indicates that the respective memory block is not cached in any caches of the one or more remote processors, and wherein the active state includes one or more states in which the memory block is cached in at least one cache of the one or more remote processors.

10. A method comprising:
 receiving a request including a first memory address of a first memory block in a memory;

detecting, based on the first memory address received in the request, a cache hit in a coherency directory cache, the cache hit indicating that a first directory cache entry of a plurality of directory cache entries in the coherency directory cache corresponds to the first memory block, and each of the plurality of directory cache entries being configured to include state and ownership information of a respective memory block in the memory;

determining that the request is to change the state of the first memory block in a respective first directory cache entry to an invalid state; and  managing the ejection of the first directory cache entry from the coherency directory cache based on one of or more policy rules, wherein the policy rules include:

a first ejection policy rule, wherein the first directory cache entry is optionally ejected based on requirements of a directory cache replacement algorithm;

a second ejection policy rule, wherein the first directory cache entry is ejected based on one or more tracking requirements; and   a third ejection policy rule, wherein the first directory cache entry is ejected independent of other requirements.

11. The method of claim 10, wherein the directory cache replacement algorithm is a least recently used (LRU) algorithm wherein the first directory cache entry is ejected based on respective replacement metrics of the plurality of directory cache entries, and wherein the replacement metrics indicate the age, ranking or position of each of the plurality of directory cache entries relative to one another based on a measure of the amount of time or order since each respective memory block of the plurality of directory cache entries was last accessed.

12. The method of claim 11, further comprising:

storing tracking information corresponding to memory regions of the memory, the tracking information indicating if memory blocks within the respective memory region are in an active state; and adjusting the tracking information corresponding to the memory region that includes the first memory block.

13. The method of claim 12, wherein managing the ejection of the first directory cache entry includes ejecting the first directory cache entry, the ejecting including removing from the first directory cache entry the data stored therein that corresponds to a coherency directory entry of a respective coherency directory.

14. The method of claim 13, further comprising managing requests relating to at least the memory, the memory including one or more memory devices forming a shared memory accessible by one or more processors.

15. The method of claim 14, wherein the inactive state indicates that the respective memory block is not cached in any caches of the one or more remote processors, and wherein the active state includes one or more states in which the memory block is cached in at least one cache of the one or more remote processors.

16. An apparatus comprising:

a request accelerator configured to store tracking information, the tracking information indicating if memory blocks are in an active state within a respective memory region; and a coherency controller including:

a coherency directory cache comprising a plurality of directory cache entries, each of the directory cache entries being configured to store a copy of a directory entry from a coherency directory, and each of the directory entries being configured to include state and ownership information of a respective memory block of the memory,  wherein the coherency controller is configured to manage the ejection of used directory cache entries from the coherency directory cache based on one or more ejection policy rules, the ejection policy rules including, for a first directory cache entry identified in a request that causes changing a state of the first directory cache to invalid:

a first ejection policy rule, wherein the first directory cache entry is optionally ejected based on requirements of a directory cache replacement algorithm;

a second ejection policy rule, wherein the first directory cache entry is ejected based on one or more tracking requirements that, in part, require that the first directory cache entry be in an invalid state as determined based tracking information associated with the memory region that includes the first memory block; and   a third ejection policy rule, wherein the first directory cache entry is ejected independent of other requirements, wherein the managing of the ejection of used directory cache entries includes ejecting at least one of the used directory cache entries by removing therefrom the copy of the respective directory entry.

17. A system comprising:

at least one of the apparatus of claim 16, wherein the at least one the apparatus is communicatively coupled to a plurality of processors and respective memories, each of the at least one of the apparatus being associated with a subset of the plurality of processors and respective memories forming a shared memory accessible by the plurality of processors, and each of the at least one of the apparatus manages requests relating to its associated subset of memories.

\* \* \* \* \*